Figure 1:
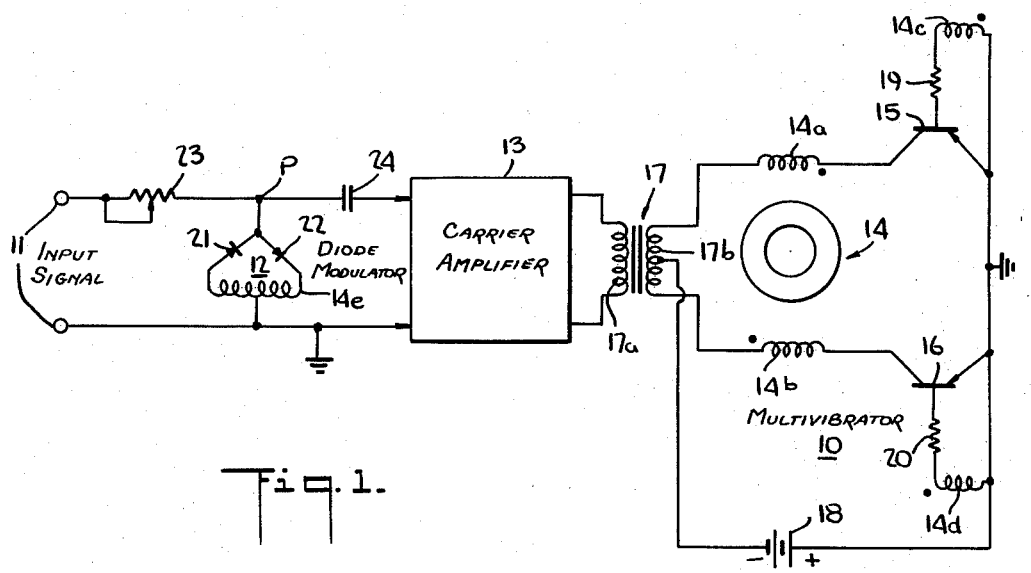

Oct. 3, 1961   R. A. RUNYAN   3,003,123
FREQUENCY MODULATED MULTIVIBRATORS
Filed Dec. 1, 1959   3 Sheets-Sheet 1

INVENTOR.
RAYMOND A. RUNYAN
BY
Kenyon & Kenyon
ATTORNEYS

INVENTOR.
RAYMOND A. RUNYAN
BY Kenyon & Kenyon
ATTORNEYS

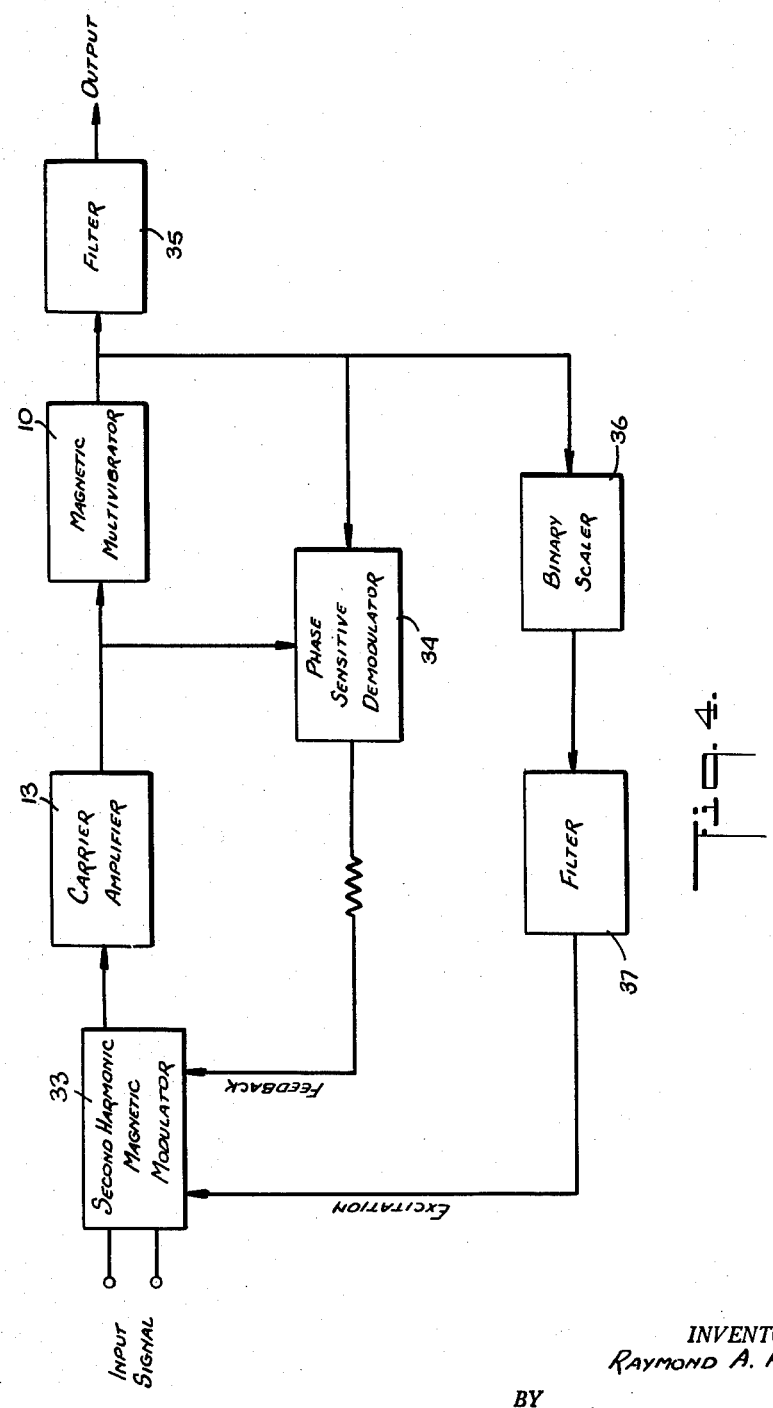

United States Patent Office 3,003,123
Patented Oct. 3, 1961

3,003,123
FREQUENCY MODULATED MULTIVIBRATORS
Raymond A. Runyan, Ridgefield, Conn., assignor to Data-Control Systems, Inc., Danbury, Conn., a corporation of Delaware
Filed Dec. 1, 1959, Ser. No. 856,549
10 Claims. (Cl. 332—22)

The present invention relates generally to frequency-modulated oscillators and more particularly to an improved circuit arrangement for frequency-modulating a magnetic multivibrator.

It is known in data systems to apply an intelligence or modulating signal to a multivibrator so as to vary the amplitude or slope of the timing wave, thereby effecting frequency modulation. Since data systems entail responses which range down to static input levels, it is the usual practice to interpose a direct-current amplifier between the signal input and the multivibrator circuit.

Direct-current amplifiers of ordinary design are not well suited for low input signals where a high degree of amplification is needed. This is because the instability of tube characteristics can result in output variations equal or greater in magnitude than would be obtained from a complete input-signal range. While it is possible to achieve good stability in direct-current amplifiers, this can only be done by means of circuits of considerable complexity.

Thus in order to effect linear modulation of the multivibrator in response to low D.-C. intelligence signals, with systems of standard design it is essential that a direct-current amplifier of good stability be employed. Such amplifiers not only make use of relatively elaborate circuits, but they are expensive and add materially to the total cost of the system.

Accordingly it is the principal object of the invention to provide a drift-free system for modulating a multivibrator which makes use of a relatively simple carrier amplifier rather than a stabilized direct-current amplifier.

More specifically, it is an object of the invention to provide a system of the above-described type wherein a square wave carrier is derived from the multivibrator and is applied through the carrier amplifier to the multivibrator, the carrier being varied as a function of an input signal or quantity to effect frequency modulation of the multivibrator.

Also an object of this invention is to provide a system wherein modulation of a magnetic multivibrator may be effected by an input intelligence voltage applied to a diode modulator, the carrier for the modulator being derived from a pick-up coil coupled to the magnetic multivibrator.

A further object of the invention is to provide a system wherein modulation may be effected by unbalancing a resistor bridge whose excitation is derived from the output of the carrier amplifier in combination with the output of the multivibrator. The bridge may be of the strain gauge type whereby the resultant frequency modulated signal may be used for telemetering purposes.

Figure 2:
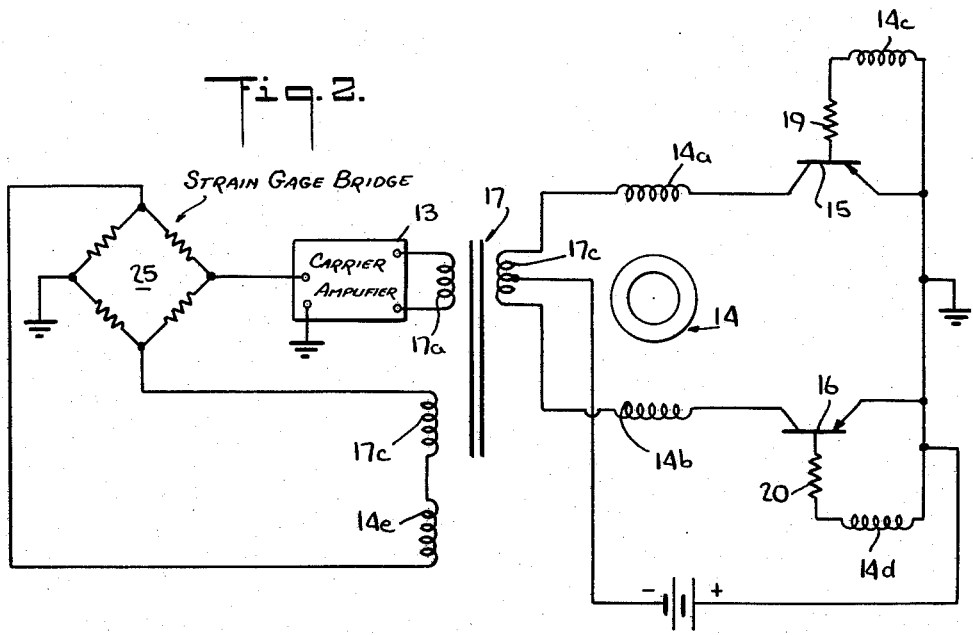
Figure 3:
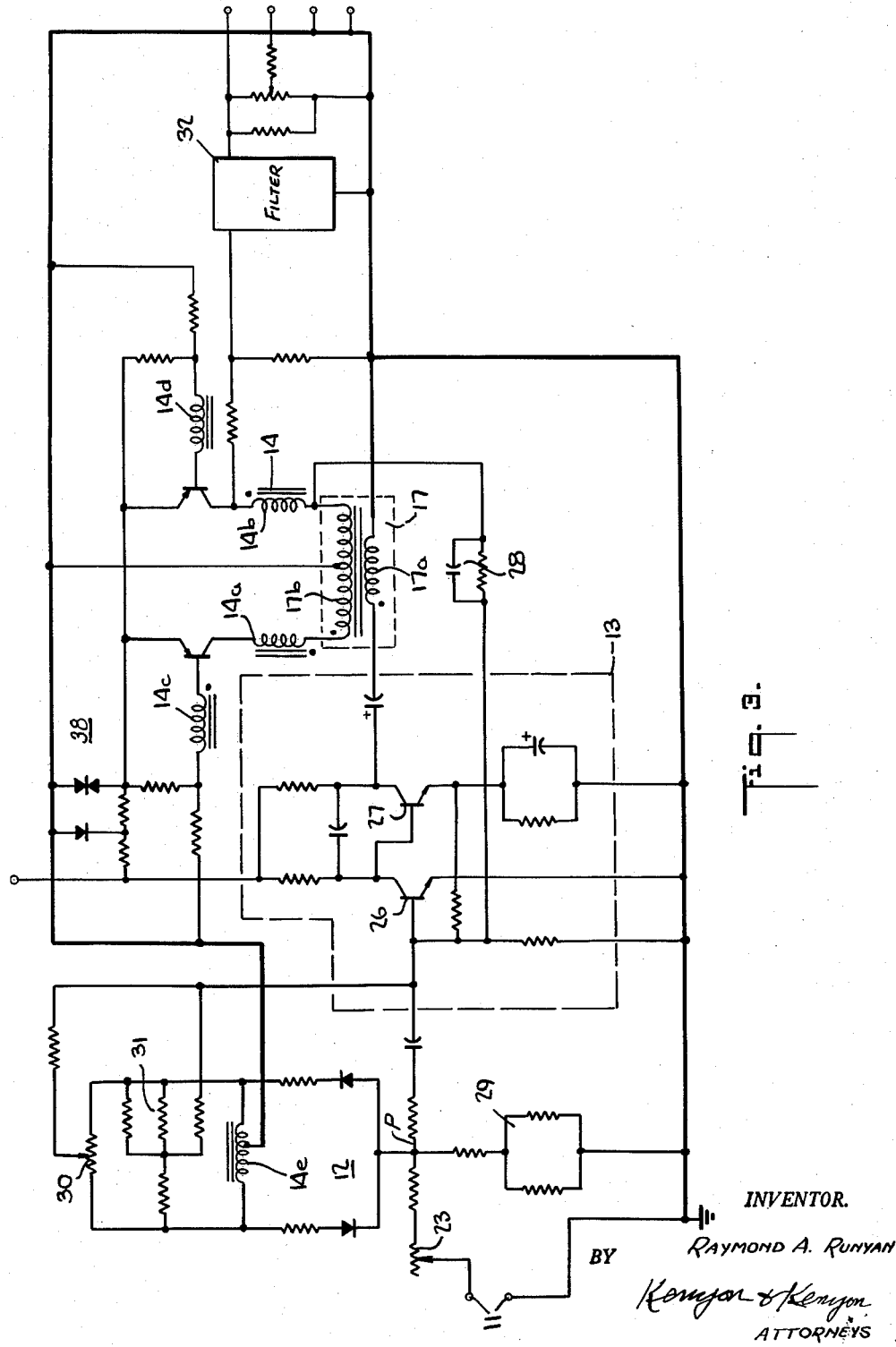

For a better understanding of the invention as well as other objects thereof, reference is made to the following detailed description to be read in connection with the accompanying drawing, wherein:

FIG. 1 is a schematic diagram in simplified form of one preferred embodiment of a circuit in accordance with the invention, FIG. 2 is a schematic diagram in simplified form of another preferred embodiment of the invention, FIG. 3 is a schematic diagram showing an actual embodiment of the invention, and FIG. 4 is a schematic diagram in simplified form of another embodiment of the invention.

Referring now to the drawings and more particularly to FIG. 1, there is shown a square wave oscillator in the form of a magnetic multivibrator, generally designated by the numeral 10, whose frequency is controlled by an input signal applied at the input terminals 11. The input signal is imposed on a diode modulator 12 whose output is fed to the multivibrator through a carrier amplifier 13.

The multivibrator is generally of the type used to convert a low direct-voltage to a high voltage and it comprises a saturable core inductor 14 provided with coils 14a, 14b, 14c, 14d and 14e which are wound about a common core. The inductor operates in conjunction with a pair of transistors 15 and 16, each of which includes base, emitter and collector electrodes. The winding direction of coils 14a and 14c are opposed to the coils 14b and 14d.

The carrier amplifier 13 may be of any conventional multi-stage vacuum tube or transistor design and may include negative feedback stabilizing networks to ensure linearity. The output of amplifier 13 is applied to multivibrator 10 through a push-pull output transformer 17 having a primary winding 17a and a center-tapped secondary 17b.

The D.-C. supply voltage for the multivibrator 10 is constituted by a battery 18 whose negative terminal is connected to the center tap of the transformer secondary 17b, the positive terminal being connected to the emitters of both transistors 15 and 16. An analysis of the multivibrator circuit will show that the frequency of operation is proportional to the supply voltage.

One end of secondary winding 17b is connected through inductor coil 14a to the collector of transistor 15, the other end being connected through inductor coil 14b to the collector of transistor 16. When transistor 15 is conductive, it will be seen that the supply voltage is effectively applied across inductor coil 14a, and when transistor 16 is conductive the supply voltage is then applied across coil 14b.

Inductor coil 14c is connected through a resistor 19 between the base of transistor 15 and the emitter. Similarly, inductor coil 14d is connected through a resistor 20 between base and emitter of transistor 16, the bias on the base of the respective transistors being determined by the voltage produced in the associated coils.

The arrangement is such that the transistors 15 and 16 are rendered alternately conductive to generate square wave oscillations. When transistor 15 is conductive, its resistance is negligible and the supply voltage appears effectively across coil 14a to induce a voltage in coil 14c which impresses a bias on the base of transistor 15 serving to maintain conductivity, a voltage being concurrently induced in coil 14d which maintains transistor 16 in the non-conductive state.

In any given half cycle in which one transistor is conductive, the core of inductor 14 is driven to saturation at which point no further voltage is induced in the coils. A transient results which turns on the opposing transistor and the half cycle is repeated.

The inductor coil 14e acts as a pick-up coil to operate the diode modulator 12, the square wave induced in this coil acting to render diodes 21 and 22 conductive for one-half cycle. It will be seen that the center of coil 14e is connected to the lower one of the input terminals 11 and ground. The respective ends of coil 14e are connected through diodes 21 and 22 to a junction point P, which point is connected to the upper one of the input terminals 11 through resistor 23. Thus the diodes are equivalent to a switch operating in synchronism with the multivibrator.

The input voltage appearing at terminals 11 is applied to the junction P of the diodes 21 and 22 through resistor 23. It will be appreciated that the amplitude of the square wave developed at the junction of diodes 21 and 22 and applied to the carrier amplifier through condenser 24 will depend and be proportional to the magnitude of the input voltage.

The resulting square wave carrier is amplified by carrier amplifier 13 and applied in push-pull relation to the magnetic multivibrator through transformer 17. The carrier voltages appearing in the output halves of transformer 17 are respectively in series with the supply voltage from battery 18 relative to coils 14a and 14b. The applied carrier voltage will therefore either add or subtract algebraically from the oscillator supply voltage on a given half cycle of operation and the phase of this voltage will reverse as the other multivibrator transistor conducts.

Thus a steady offset in frequency results from a D.-C. input voltage. A reversal of input polarity at terminals 11 will produce a frequency shift in the opposite sense. The carrier frequency of the multivibrator is that generated in the absence of a modulation input signal and the degree and direction of departure from the carrier frequency is determined by the magnitude and polarity of the input signal.

It is to be understood that the invention is not limited to the saturable core magnetic multivibrator shown and may be used with R-C and R-L multivibrators as well, whether of the transistor or vacuum tube type. As pointed out above, the basic advantage of the circuit resides in the elimination of direct-current amplifiers as a source of drift and instability.

Referring now to FIG. 2, there is shown a method for modulating the multivibrator by means of a bridge subject to external conditions rather than by an input voltage. The multivibrator circuit is identical to that shown in FIG. 1, but in place of a diode modulator there is provided a resistor bridge 25 having four legs in a diamond arrangement. In practice, the resistors may be of the strain gauge type and the oscillator may be used to transmit the bridge output to a remote point. It will be obvious that the other telemetering applications involving bridges which reflect a change of condition are also feasible within the context of the invention. For example, bridges responsive to temperature variations or flow conditions may be used in conjunction with the system disclosed herein.

The carrier amplifier 13 is connected to the output diagonals of the bridge. Applied to the input diagonal is an excitation voltage derived from a combination of the oscillator output appearing at inductor coil 14e and the carrier amplifier output taken from an additional or tertiary winding 17c on push-pull output transformer 17. The arrangement is such that in the absence of a strain force, the bridge is balanced and a null is established at the input of the carrier amplifier. A change in external conditions effects a change in the relative resistances in the bridge to produce an unbalance, thereby generating an output voltage.

Coil 14e and winding 17c are used to hold the bridge excitation voltage constant so as to permit linear frequency deviation as a function of bridge balance. In the oscillator circuit, the sum of the voltages appearing across one-half of transformer secondary 17b and either of the indicator coils 14a or 14b is equal to the oscillator supply voltage. If the turns on coil 14e are related to those on coil 14b by the same ratio as the turns on winding 17c are related to half of winding 17b, the bridge excitation remains constant independently of modulation. Hence linear modulation of the oscillator is effected.

Referring now to FIG. 3, an actual embodiment of the invention is shown in detail, the circuit being functionally equivalent to that in FIG. 1.

The carrier amplifier 13 is constituted by two transistor stages 26 and 27, the output of the second stage being coupled to the push-pull output transformer 17. Stabilization of the carrier amplifier is effected by a feedback network 28 connected between the secondary of transformer 17. The input voltage is applied at terminals 11 to the junction P of the diode modulator 12, the variable resistor 23 serving as a sensitivity adjustment. Temperature compensation for sensitivity is effected by means of a resistor network 29 which includes a thermistor element. Zero adjustment of the diode modulator is effected by potentiometer 30 connected across coil 14e, and temperature compensation therefore is effected by resistor network 31. The input voltage for the multivibrator is taken from a diode network 38.

The frequency modulated output of the multivibrator is taken from coil 14b through a suitable bandpass filter 32. It will be appreciated that the circuit shown is operationally the same as that in FIG. 1.

Another embodiment of the invention is illustrated in FIG. 4 in which a binary scaler is used to divide the subcarrier frequency by two and the resulting signal is filtered and used to drive the magnetic modulator. As illustrated in FIG. 4, the second harmonic output of the magnetic modulator 33 is amplified by the carrier amplifier 13. The output of the carrier amplifier 13 is fed to the magnetic multivibrator 10 and to the phase sensitive demodulator 34. The output of the magnetic multivibrator 10 is fed to a filter 35 to produce the desired subcarrier and to the demodulator 34 and a binary scaler 36.

The demodulated signal output of the demodulator 34 is fed back to the modulator 33 in order to stabilize the system sensitivity. The scaler 36 divides the subcarrier frequency by two and the resulting signal is filtered by the filter 37 and used to drive the modulator 33.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A frequency-modulation system comprising a multivibrator for generating square wave oscillations, a modulator excited by said multivibrator, a carrier amplifier coupling said modulator to said multivibrator, means to derive a carrier wave from said multivibrator and to apply same to said modulator, and means to apply to said modulator an input signal to vary the amplitude and sense of said carrier wave whereby the frequency of said multivibrator is modulated accordingly.

2. A frequency-modulation system comprising a multivibrator for generating square wave oscillations, a diode modulator excited by said multivibrator, a carrier amplifier coupling said modulator to said multivibrator, means to derive a carrier wave from said multivibrator and to apply same to said modulator, and means to apply to said modulator an input signal to vary the amplitude and sense of said carrier wave whereby the frequency of said multivibrator is modulated accordingly.

3. A frequency-modulation system comprising a multivibrator for generating square wave oscillations, a bridge modulator excited by said multivibrator, a carrier amplifier coupling said modulator to said multivibrator, means to derive a carrier wave from said multivibrator and to apply same to said bridge modulator, said bridge including resistance elements which are adjusted as a function of an input quantity to vary the amplitude and sense of said carrier wave whereby the frequency of said multivibrator is modulated accordingly.

4. A frequency-modulation system comprising a magnetic multivibrator for generating square wave oscillations including a saturable core inductor and a pair of transistors which are alternately rendered conductive, a diode modulator excited by said multivibrator, a carrier amplifier coupling said modulator to said multivibrator in push-pull relation, means including a coil coupled to said inductor to derive a carrier wave from said multivibrator and to apply same to said modulator, and means to operate said modulator as a function of an input quantity to vary the amplitude and sense of said carrier wave whereby the frequency of said multivibrator is modulated accordingly.

5. A frequency-modulation system comprising a magnetic multivibrator including first and second transistors, each having a base, an emiter and a collector, a saturable core inductor provided wtih first and second pairs of coils, and a direct voltage source having one end connected to the emitters of both transistors and the other end connected through one coil in said first pair thereof to the collector of the first transistor and through one coil in said second pair thereof to the collector of the second transistor, the other coil in said first pair being connected between the base and emitter of said first transistor, the other coil in said second pair being connected between the base and emitter of said second transistor; a modulator including a pick-up coil wound on said inductor to derive therefrom a square wave carrier, means to apply an input signal to said modulator to vary the amplitude and sense of said square wave carrier; and a carrier amplifier coupled to said modulator to apply said modulated carrier in push-pull relation to said one coils in said first and second pairs whereby the voltage thereacross is the resultant of said source voltage and said modulated carrier, thereby frequency-modulating said multivibrator as a function of the input signal.

6. Frequency modulation system comprising a magnetic multivibrator including first and second transistors, each having a base, an emitter and a collector, a saturable core inductor provided with a first pair of coils wound in one direction and a second pair of coils wound in the opposing direction relative to the core of the inductor, and a direct-voltage source having one end connected to the emitters of both transistors and the other end connected through one coil in said first pair thereof to the collector of the first transistor and through one coil in said second pair thereof to the collector of the second transistor, the other coil in said first pair being connected between the base and emitter of said first transistor, the other coil in said second pair being connected between the base and emitter of said second transistor, said transistors being rendered alternately conductive whereby the frequency of said multivibrator depends on the voltage applied across said one coil in said first and second pairs thereof; a diode modulator including a pick-up coil wound on said inductor to derive therefrom a square wave carrier, means to apply an input signal to said modulator to vary the amplitude and sense of said square wave carrier, and a carrier amplifier coupled to said modulator to apply said modulated carrier in push-pull relation to said one coils in said first and second pairs whereby the voltage thereacross is the resultant of said source voltage and said modulated carrier, thereby frequency-modulating said multivibrator as a function of the input signal.

7. A system as set forth in claim 6, wherein said amplifier includes a push-pull output transformer having a center tapped secondary interposed between said one coils in said first and second pairs, the one end of said voltage source being connected to the center tap of said secondary.

8. A system, as set forth in claim 6, wherein said diode modulator includes a pair of diodes connected between the ends of said pick-up coil and a junction point connected to one input terminal of said carrier amplifier, the other input terminal of said amplifier being connected to the center of the pick-up coil, the input signal being applied between said junction point and said coil center.

9. A frequency modulation system comprising a magnetic multivibrator including first and second transistors each having a base, an emitter and a collector, a saturable core inductor provided with a first pair of coils wound in one direction and a second pair of coils wound in the opposing direction relative to the core of the indicator, and a direct voltage source having one terminal connected to the emitters of both transistors and the other end connected through one coil in said first pair thereof to the collector of the first transistor and through one coil in said second pair to the collector of the second transistor, the other coil in said first pair being connected between the base and emitter of said first transistor, the other coil in said second pair being connected between the base and emitter of said second transistor, said transistors being rendered alternately conductive whereby the frequency of said multivibrator depends on the voltage applied across said one coil in said first and second pairs thereof; a bridge modulator having input and output diagonals, means to apply an excitation carrier voltage to said input diagonals derived from said multivibrator, said bridge including resistance elements which are adjusted as a function of an input quantity to vary the amplitude and sense of said carrier voltage whereby the said carrier voltage is modulated to provide a modulated carrier, and a carrier amplifier coupled to the output diagonals of said modulator to apply said modulated carrier in push-pull relation to said one coil in said first and second pairs whereby the voltage thereacross is the resultant of said source voltage and said modulated carrier thereby frequency-modulating said multivibrator.

10. A system as set forth in claim 9, wherein said bridge is constituted by strain gauge resistors.

References Cited in the file of this patent

UNITED STATES PATENTS 2,938,129  House _____ May 24, 1960